United States Patent
Vandenbussche et al.

(10) Patent No.: US 12,477,071 B2
(45) Date of Patent: Nov. 18, 2025

(54) SYSTEM AND METHOD FOR VISUALIZATION OF VARIANCES OBSERVED ON SUBSTRATE SURFACES

(71) Applicant: ESKO SOFTWARE BV, Ghent (BE)

(72) Inventors: Dries Vandenbussche, Ghent (BE); Rian Goossens, Ghent (BE); Barry Ben Ezra, Ghent (BE); Jeroen Penninck, Ghent (BE)

(73) Assignee: ESKO SOFTWARE BV, Ghent (BE)

( * ) Notice: Subject to any disclaimer, the term of this patent is extended or adjusted under 35 U.S.C. 154(b) by 134 days.

(21) Appl. No.: 18/031,319

(22) PCT Filed: Oct. 12, 2021

(86) PCT No.: PCT/EP2021/078233
§ 371 (c)(1),
(2) Date: Apr. 11, 2023

(87) PCT Pub. No.: WO2022/079064
PCT Pub. Date: Apr. 21, 2022

(65) Prior Publication Data
US 2023/0379413 A1 Nov. 23, 2023

Related U.S. Application Data

(60) Provisional application No. 63/090,545, filed on Oct. 12, 2020.

(51) Int. Cl.
*H04N 1/00* (2006.01)
*H04N 1/58* (2006.01)
*H04N 1/60* (2006.01)

(52) U.S. Cl.
CPC ..... *H04N 1/00023* (2013.01); *H04N 1/00034* (2013.01); *H04N 1/00074* (2013.01);
(Continued)

(58) Field of Classification Search
CPC ........... H04N 1/00015; H04N 1/00023; H04N 1/00029; H04N 1/00031; H04N 1/00034;
(Continued)

(56) References Cited

U.S. PATENT DOCUMENTS

| | | | |
|---|---|---|---|
| 6,373,964 B1 * | 4/2002 | Geissler | B41F 33/0045 399/9 |
| 7,017,492 B2 * | 3/2006 | Seymour | B41F 33/0036 358/1.9 |
| 7,734,082 B2 * | 6/2010 | Honda | G06T 7/0004 348/126 |
| 9,280,729 B2 * | 3/2016 | Yamamoto | G03G 15/00 |

(Continued)

FOREIGN PATENT DOCUMENTS

| DE | 102017216260 A1 * | 3/2019 | ......... B41F 33/0036 |
|---|---|---|---|
| EP | 1 457 335 | 12/2010 | |

(Continued)

OTHER PUBLICATIONS

International Search Report regarding related PCT application PCT/EP2021/078233, mailed Jan. 24, 2022 (5 pgs.).

(Continued)

*Primary Examiner* — Scott A Rogers
(74) *Attorney, Agent, or Firm* — Hahn Loeser & Parks, LLP

(57) ABSTRACT

A method for controlling production of color products includes receiving a reference image for a color product; producing a plurality of color products corresponding to the color product in the reference image; acquiring a plurality of images corresponding to the plurality of color products; determining whether an appearance defect exists for each of the plurality of color products by comparing each image of the plurality of images corresponding to the plurality of color products to the reference image; for each detected appearance defect, determining a severity of the appearance defect; generating a visualization of appearance defects on an image of the color product based on the severity of the appearance defect and a frequency of occurrence of the (Continued)

appearance defect; and adjusting production of the color product in response to the visualization of appearance defects to reduce the severity or frequency of occurrence of the appearance defect.

19 Claims, 9 Drawing Sheets

(52) U.S. Cl.
CPC ....... *H04N 1/00087* (2013.01); *H04N 1/0009* (2013.01); *H04N 1/58* (2013.01); *H04N 1/6033* (2013.01); *H04N 1/6097* (2013.01)

(58) Field of Classification Search
CPC .......... H04N 1/00037; H04N 1/00039; H04N 1/00045; H04N 1/00068; H04N 1/00074; H04N 1/00076; H04N 1/00079; H04N 1/00082; H04N 1/00087; H04N 1/0009; H04N 1/58; H04N 1/603; H04N 1/6033; H04N 1/6097; G06T 7/0002; G06T 7/90; G06T 2207/10004; G06T 2207/10008; G06T 2207/10024; G06T 2207/20228; G06T 2207/30108; G06T 2207/30144; G06T 2207/30168; B41F 33/0036; G06Q 10/06–067
See application file for complete search history.

(56) References Cited

U.S. PATENT DOCUMENTS

| | | | | |
|---|---|---|---|---|
| 9,316,987 | B2 * | 4/2016 | Hitosugi | .............. G03G 15/065 |
| 9,485,390 | B2 * | 11/2016 | Tamagawa | ............... H04N 1/54 |
| 9,495,736 | B2 * | 11/2016 | Kawabata | .............. G06T 7/001 |
| 11,458,724 | B2 * | 10/2022 | Gamm | ................ B41F 33/0036 |
| 2014/0093139 | A1 * | 4/2014 | Yamagishi | ......... H04N 1/00005 |
| | | | | 382/112 |
| 2021/0321006 | A1 * | 10/2021 | Kurohata | ........... H04N 1/00411 |
| 2024/0163376 | A1 * | 5/2024 | Ishikawa | ........... H04N 1/00082 |

FOREIGN PATENT DOCUMENTS

| | | | | |
|---|---|---|---|---|
| EP | 3 076 366 | | 5/2016 | |
| EP | 3 109 826 | | 12/2016 | |
| EP | 2 713 596 | | 2/2020 | |
| JP | 2024050672 A | * | 4/2024 | ........... G06T 7/0004 |

OTHER PUBLICATIONS

Written Opinion of the International Searching Authority regarding related PCT application PCT/EP2021/078233, mailed Jan. 24, 2022 (11 pgs.).
International Preliminary Report on Patentability related to PCT/EP2021/078233, dated Apr. 27, 2023 (10 pgs.).
Communication pursuant to Article 94(3) EPC regarding related EP 21790877.1, dated Mar. 17, 2025 (6 pgs.).

* cited by examiner

SYSTEM AND METHOD FOR VISUALIZATION OF VARIANCES OBSERVED ON SUBSTRATE SURFACES

CROSS-REFERENCE TO RELATED APPLICATIONS

The present application is a national phase entry of International Application Number PCT/EP2021/078233, filed Oct. 12, 2021, which claims the benefit of U.S. Provisional Application No. 63/090,545, filed Oct. 12, 2020.

BACKGROUND

Bags, cartons, labels, cans, bottles and other packaging and labeling for retail products offered for sale in pharmacies and supermarkets, for example, are printed generally either very long rolls of continuous material (plastic, carton, paper) or on stacks of sheets (carton, paper, metal). Quality of print is very important, as the colors must be accurate for brand recognition and attract customers. Also, text content must be readable and barcodes scannable.

Color management in the design, specification and production of retail packaging and other printed materials is highly important to owners of retail brands ("brand owners"). Colors affect perceptions and behaviors of consumers with respect to brands and retail products and influence consumers to consider specific brands or make a purchase. A brand's color may be just as important to driving retail sales, if not more important, than a brand's logo or name. Accordingly, great emphasis is put on accurately reproducing a brand's color on retail packaging regardless of substrate (paperboard, metallic can, plastic label) and other printing conditions.

One of the goals of color management is aligning production capabilities with the expectations of brand owners. To do this, color test patches of production colors may be measured by spectrophotometers or other color measurement instruments, and reports on color accuracy, such as numerical scores, are reported back to a purchaser. While having a score for the accuracy of the colors on a color test strip provides valuable feedback on print color accuracy, the test strips are generally not displayed to consumers, and the test strip score does not necessarily provide feedback on whether consumer-facing visual appearance of the printed product is free from localized color variations or printing defects.

In other examples of printing quality control, on a print production floor the printed continuous webs or sheets are monitored by cameras that are connected to a print inspection system. Examples of such systems are offered by AVT Ltd. The cameras may be on the printing press or on a post-press machine. The print inspection analyzes the images to detect color reproduction and print defects.

At the start of a new print job, the print inspection system receives or captures a known reference image of the printed designs, and saves this as a master image for reference. Thereafter the print inspection system compares every printed product against the master image to detect differences in the print product relative to the master image. The changes detected are in color, content, relative position of one color to another which may be caused by the instability of the printing process and materials. If the changes pass thresholds set by the operator, these are flagged as defects, presented on screen, and recorded in a database. The larger the difference—the more severe a defect is noted. Defect size and contrast are the main severity attributes.

As production runs are often long and at high speeds, the operator first uses the displayed defect information to take corrective action on the press, but does not stop the press. At a post press station, another operator and computerized system will utilize the accumulated database of defects to locate and remove the defective material, prior to shipping to the end customer.

Visualizing the data is currently done by presenting a virtual roll map, where the defect positions are noted against a background that does not include the designs that were printed. The operator can scroll along the sheets or kilometer of production roll, and select each individual defect to view where it was positioned on the printed design. This does not provide a clear picture of where the defects fell on the design, or whether there were many defects on one side or another of the press, etc. It is difficult to get a clear picture of what happened where. Also, the defect indication does not provide any feedback concerning the severity of the defects—just where they are on the roll or sheet.

While such known processes are useful for quality assurance processes, the information is not represented in a way that provides an intuitive understanding of the quality of the printing job as a whole or corrective actions to be taken by a print press operator.

SUMMARY

A method for controlling production of color products comprises receiving a reference image for a color product; producing a plurality of color products corresponding to the color product in the reference image; acquiring a plurality of images corresponding to the plurality of color products; determining whether an appearance defect exists for each of the plurality of color products by comparing each image of the plurality of images corresponding to the plurality of color products to the reference image; for each detected appearance defect, determining a severity of the appearance defect; generating a visualization of appearance defects on an image of the color product based on the severity of the appearance defect and a frequency of occurrence of the appearance defect; and adjusting production of the color product in response to the visualization of appearance defects to reduce the severity or frequency of occurrence of the appearance defect.

In some embodiments, the color product comprises a printed product and the appearance defect comprises a print defect. The print defect may comprise a color being out of tolerance of a production color. The print defect may comprise a printing registration error. In one example, where the color product comprises a printed product produced on a printing press and the appearance defect comprises a print defect, adjustments are made to the print press in response to the visualization of appearance defects.

The visualization of appearance defects may comprise a single layer image or a multiple layer image. In examples having multiple layers, layers comprising one or more type of appearance defect are selectively displayable.

In another example, the color product comprises a glazed ceramic product. In another example, color product comprises a polymer product.

In some embodiments, the step of determining whether an appearance defect exists comprises comparing each of the plurality of images corresponding to a plurality of color products to the reference image on a pixel-by-pixel basis.

The visualization image may comprises the reference image or an image of one of the plurality of color print products acquired when performing the method.

In some embodiments, the step of determining whether a defect exists further comprises storing defect information in a database. In some embodiments, the step of generating a visualization of appearance defects further comprises accessing the defect information stored in the database.

DETAILED DESCRIPTION

Figure 1:
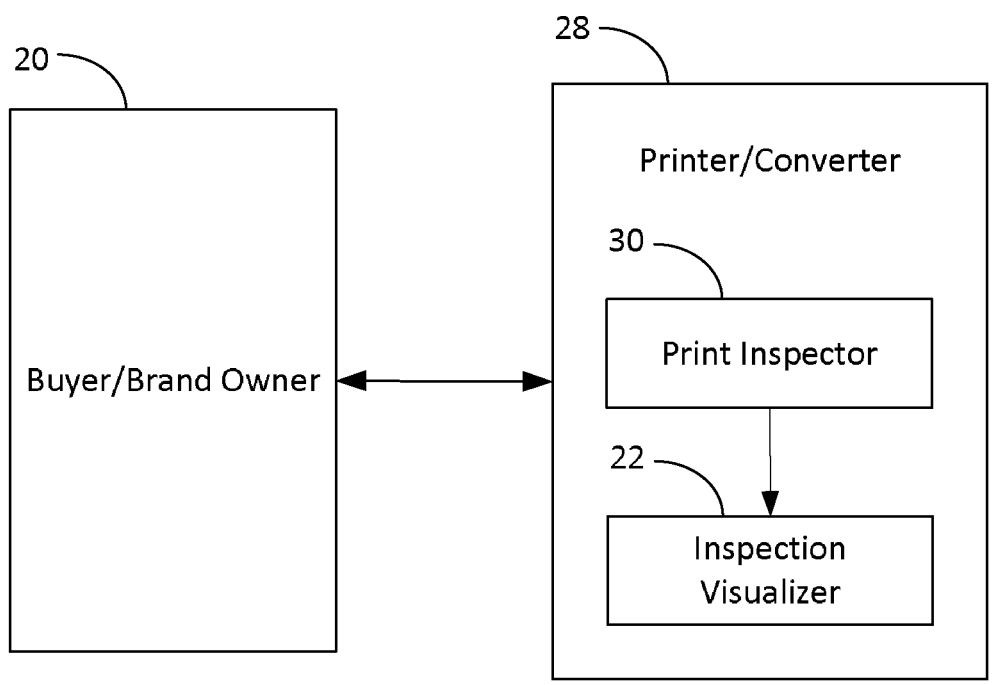
FIG. 1 is a block diagram showing an exemplary data flow according to one aspect of the present invention.

In the present disclosure, references in the singular may also include the plural. Specifically, the word "a" or "an" may refer to one, or one or more, unless the context indicates otherwise.

The term "visual appearance" or briefly "appearance" is to be understood broadly as the way in which an object reflects and/or transmits light, including but not limited to, how individuals viewing the object perceive color and surface texture of the object in various viewing conditions. Appearance also includes instrumented measurements of how an object reflects and/or transmits light.

One aspect of visual appearance is color. The "color" of an object is determined by the parts of the spectrum of incident white light that are reflected or transmitted without being absorbed. The color of an object can be described by "color attributes". In general terms, color attributes are indicative of the spectral response of the object when it is illuminated by incident light. In the context of the present disclosure, the term "color attribute" is to be understood broadly as encompassing any form of data that is indicative of the spectral response of an object when it is illuminated by incident light. Color attributes can take the form of color values in an arbitrary color space, e.g. in a trichromatic color space like RGB or CIEXYZ, or in any other color space like CIELAB (L*a*b*) or CIE L*C*h, or in the form of spectral data representative of a spectral response of a material to incident light, in arbitrary format. In the context of the present disclosure, color attributes may in particular include absorption and scattering coefficients of a material at a plurality of wavelengths.

The term "database" refers to an organized collection of data that can be accessed electronically by a computer system. In simple embodiments, the database can be a searchable electronic file in an arbitrary format. Examples include a Microsoft Excel™ spreadsheet or a searchable PDF document. In more sophisticated embodiments, a database can be a relational database that is maintained by a relational database management system using a language like SQL.

The term "computer" or "computing device" refers to any device that can be instructed to carry out sequences of arithmetic or logical operations automatically via a program. Without limitation, a computer can take the form of an Internet-accessible server, a desktop computer, a notebook computer, a tablet computer, a smartphone, a programmable digital signal processor etc. A computer generally includes at least one processor and at least one memory device. A computer may be a subunit of another device, such as an appearance capture device. A computer may configured to establish a wired or wireless connection to another computer, including a computer for querying a database. A computer can be configured to be coupled to a data input device like a keyboard or a computer mouse or to a data output device like a display or a printer via a wired or wireless connection.

A "computer system" is to be broadly understood as encompassing one or more computers. If the computer system comprises more than one computer, these computers do not necessarily need to be at the same location. The computers within a computer system may communicate with one another via wired or wireless connections.

A "processor" is an electronic circuit which performs operations on an external data source, in particular, a memory device.

A "memory device" or briefly "memory" is a device that is used to store information for use by the processor. The memory device may include volatile memory, as for random-access memory (RAM), and nonvolatile memory, as for read-only memory (ROM). In some embodiments, the memory device may include a non-volatile semiconductor memory device such as an (E)EPROM or a flash memory device, which may take the form of, e.g., a memory card or a solid-state disk. In some embodiments, the memory device may include a mass storage device having mechanical components, like a hard disk. The memory device can store a program for execution by the processor. A non-volatile memory device may also be called a non-volatile computer-readable medium.

A "program" is a collection of instructions that can be executed by processor to perform a specific task.

Referring to FIG. 1, in some embodiments, a Buyer/Brand Owner 20 generates a print product specification for a color printed product. A color printed product may comprise, for example, a printed paper product, a printed metal product, a printed plastic film product, a printed adhesive label, packaging or labeling for a retail product, or a combination thereof. The print product specification includes a description of the materials to be used to make the product, artwork, including a reference image of the color product to be produced, and color specifications for the final product. An example of a print product specification 70 may be found in FIG. 5, for example. The print product specification may also include printing information, such as color separations for printing plates. The print product specification also includes Quality Assurance Package. An example of a Quality Assurance Package 80 is a ColorCert Job, such as is produced by X-Rite Inc. ColorCert software.

The Buyer/Brand Owner 20 provides the print product specification, including the Quality Assurance Package, to a Printer/Converter 28. A Print Inspector 30 comprising one or more imaging devices, such as RGB cameras, is installed at the Printer/Converter 28. The Print Inspector 30 may be installed on a printing press or post-press equipment. An Inspection Visualizer 22 is operatively connected to the Print Inspector 30. In the illustrated embodiment, the Inspection Visualizer 22 is located at the Printer/Converter premises. However, the Inspection Visualizer 22, in other embodiments, is located remotely from the Printer/Converter 30. The connection to the Print Inspector may be over a computer network.

During production of the color printed product, the Printer/Converter 28 measures color test patches printed as part of the unfinished color printed product and compares the measurements to color specifications provided in the Quality Assurance Package. This may be done with quality assurance software, which generates a numerical score for the quality of the color reproduction, which the Printer/Converter 28 reports back to the Buyer/Brand Owner 20. While this score accurately represents the quality of color reproduction for spot and process colors, it does not provide information of the quality of reproduction across the complete color printed product.

The Print Inspector 30 cameras acquire an image of each color printed product at the printing press or at a post-press operation. For labels and flat color printed products, the images may be of a finished product. For three-dimensional color printed products, the image may be of unfinished products that have not been separated from the web. The images are provided to Print Inspector 30. Print Inspector 30 compares the images to the reference image and colors specified in the print product specification and identifies issues with color accuracy and other print defects. For example, a label print inspector system may detect color variations, mis-registration, missing print, spots, imperfect matrix peeling, die cut registration and other defects. A print packaging Print Inspector 30, for example, may detect print defects, including color variations, mis-registration, streaks, strips of missing ink, ink splashes, and misprints. The defect data is recorded and stored in a database. Data may also be presented to press operators and post press operators.

An Inspection Visualizer 22 accesses the database of the Print Inspector 30. While the Inspection Visualizer 22 and the Print Inspector 30 are described as separate entities for ease of reference, in some embodiments they are combined into a single system. The Inspection Visualizer 22 generates a visualization of appearance defects 50 comprising a single layer or multi-layer image of the printed material and the defects, such that it is easy to see the distribution of color variances and print defects relative to the printing press and process, as well as relative to the print product specification, and all of this with severity and over time. This may also be referred to as a "heatmap" of printing errors.

Figure 2:
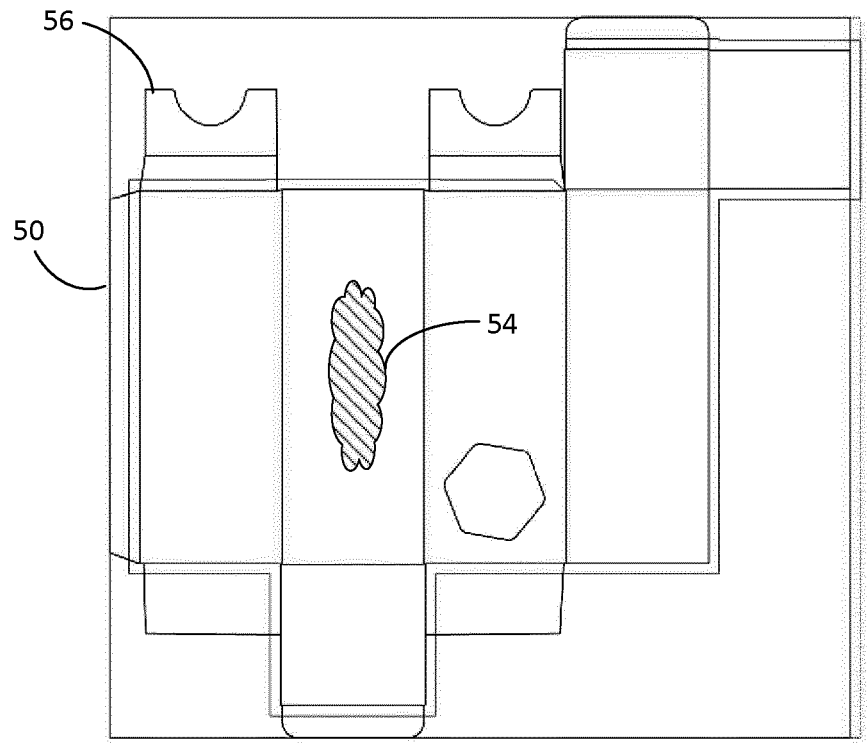
FIG. 2 is a visualization of appearance defects on a color product according to another aspect of the present invention.
Figure 3:
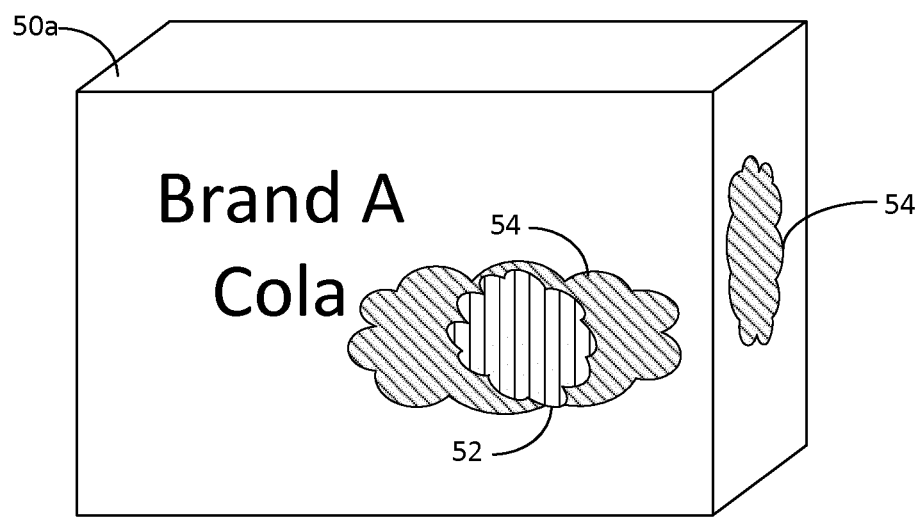
FIG. 3 is a 3-D visualization of appearance defects on a color product according to another aspect of the present invention

The visualization heatmap 50 overlays the defect severity and location information on an image of the printed designs, where the defects are occurring. Referring to FIGS. 2 and 3, the visualization heatmap 50, 50a illustrates more severe defect locations 52 in red (vertical cross hatch) and less severe defect location 54 in green (diagonal cross hatch), for example, with appropriate gradients in between. Viewing this picture of the entire print run, with all the defects layered on top of each other, will quickly show if the defect distribution points to some problem in the press or material. The Inspection Visualizer 22 also provides an animated series of meter after meter or sheet after sheet of print. This visualizes how the defects change and/or move over time during a press run—when an area started to evolve into a severe defect area.

In some embodiments, the defect overlays have individual layers to show different types of defects (color variance, streak, spot, barcode) and these defect layers can be switched on and off in the heatmap per need.

The defects are displayed over an image of the color print product so one can quickly identify if they are positioned over the brand logo, for example, or in an area of no concern such as an inner flap of a milk carton. In some embodiments, this is done either in a 2D flat manner, showing the defect heatmap over what the material looked like during printing, (visualization 50, FIG. 2) or in a 3D manner, showing the same heatmap overlaid on the actual package shape (visualization, 50a FIG. 3). The latter has the advantage of viewing the defective areas relative to the actual final product, as it will stand on the shelf or in the consumers home. In many designs it is not easy for an operator to imagine this without such a 3D display. In some embodiments, the image of the color print product is the reference (master) image. In some embodiments, the image of the color print product is an image captured by the Print Inspector 30.

Color variations may be detected and visualized in several ways, including the following. For images captured by the Print Inspector System 30, RGB values are converted to a three-dimensional color space, such as, for example, L*a*b* color space. Other color spaces may be used. A delta E value is calculated between the Print Inspector 30 images and the Master image of the product specification on a pixel-by-pixel basis. For color variations within tolerance, the product image is displayed. For color variations exceeding tolerance, a defect color is displayed. The larger the delta E, the more intense the color on the heatmap. For example, minor color variations over tolerance may be represented in green, and severe color variations represented in red, with gradients of color between.

For print defects, in some embodiments, the visualization comprises a combination of severity of defect and frequency of defect. For example, printing webs may be kilometers long. A severe, but transient, defect may not require the attention of the press operator or production manager, and would not necessarily be visualized. Less severe defects, however, if repeated frequently (a larger percentage of products for a production run) or consistently along kilometers of production, may require press operator attention and would be visualized. Severe defects occurring frequently would be given the most urgent visualization color. Each type of print defect would also be categorized, and each category of defect can be visualized separately from other defects. In some embodiments, different defect types have different colors, so multiple defect types may be displayed concurrently.

In some embodiments, the Inspector Visualizer 22 generates heatmap images for a single production run. In some embodiments, the Inspector Visualizer 22 generates heatmap images over several print runs of the same print design, and yet additional embodiments the Inspector Visualizer 22 generates heatmap images over several different print design jobs for different Buyers, but having the same or similar materials. Additional embodiments may present heatmaps of a mix of print jobs executed on different press machines, enabling finding patterns that repeat themselves across printing presses. This helps the Printer/Converter 28 gain an understanding of printing press operation for a given set of printing materials, and over time and environmental conditions, including maintenance and skill level of the press operators. This can visualize color drift or accumulation of printing errors over the course of a print run, as well as the appearance of artifacts in some spatial position in the press.

Press operators may use the visualization heatmaps 50, 50a to adjust printing press operation during a printing run. Quality assurance operators may use the heatmaps to determine whether defects require removal of a color printed product prior to delivery. For example, if defects of color variations are located on the face of a package are more important to identify and remove than defects on the bottom of a package. Production managers may use heatmaps generated based on a source of printing materials, e.g., substrate, ink base, over multiple production runs and/or on multiple printing presses. In this way, variances over time or from different vendors may be identified.

Large printing webs are often separated in to smaller rolls of products before delivery to the Buyer/Brand Owner 20. For example, a printing press may be sufficiently wide to print several "lanes" of a color printed product concurrently. The lanes of printed product may be slit and then rolled in smaller rolls for shipment to the Buyer. This, however, disassociates the smaller rolls from the heatmap images, which may be generated from the larger, un-slit web. In some embodiments, the Buyer/Brand Owner 20 installs a print inspection system and images incoming rolls of color printed product for quality assurance. In such embodiments, Inspector Analyzer 22 is deployed at an incoming inspection Print Inspector and generates heatmap images of its color print product. This helps the Buyer/Brand Owner 20 to assess the quality of the printing job.

In some embodiments, a label with a unique barcode ID is applied to each roll shipped to the Buyer/Brand Owner 20 to identify each roll to associate each delivered roll to inspection information in the Print Inspector 30. The barcode is created by coordination between the Print Inspector 30 and the production systems, such as MIS, in accordance with a known production plan. At each point along the production floor the information on what has been done (what length and what width) is collected, including what lengths of material have been removed. When a quality assurance operator at the Buyer/Brand Owner 20 scans the barcode ID, the Buyer/Brand Owner 20 retrieve and view the General View of the heatmap of quality and color of the material for each identified roll. This is an alternative to the Brand purchasing a dedicated inspection solution.

Figure 4:
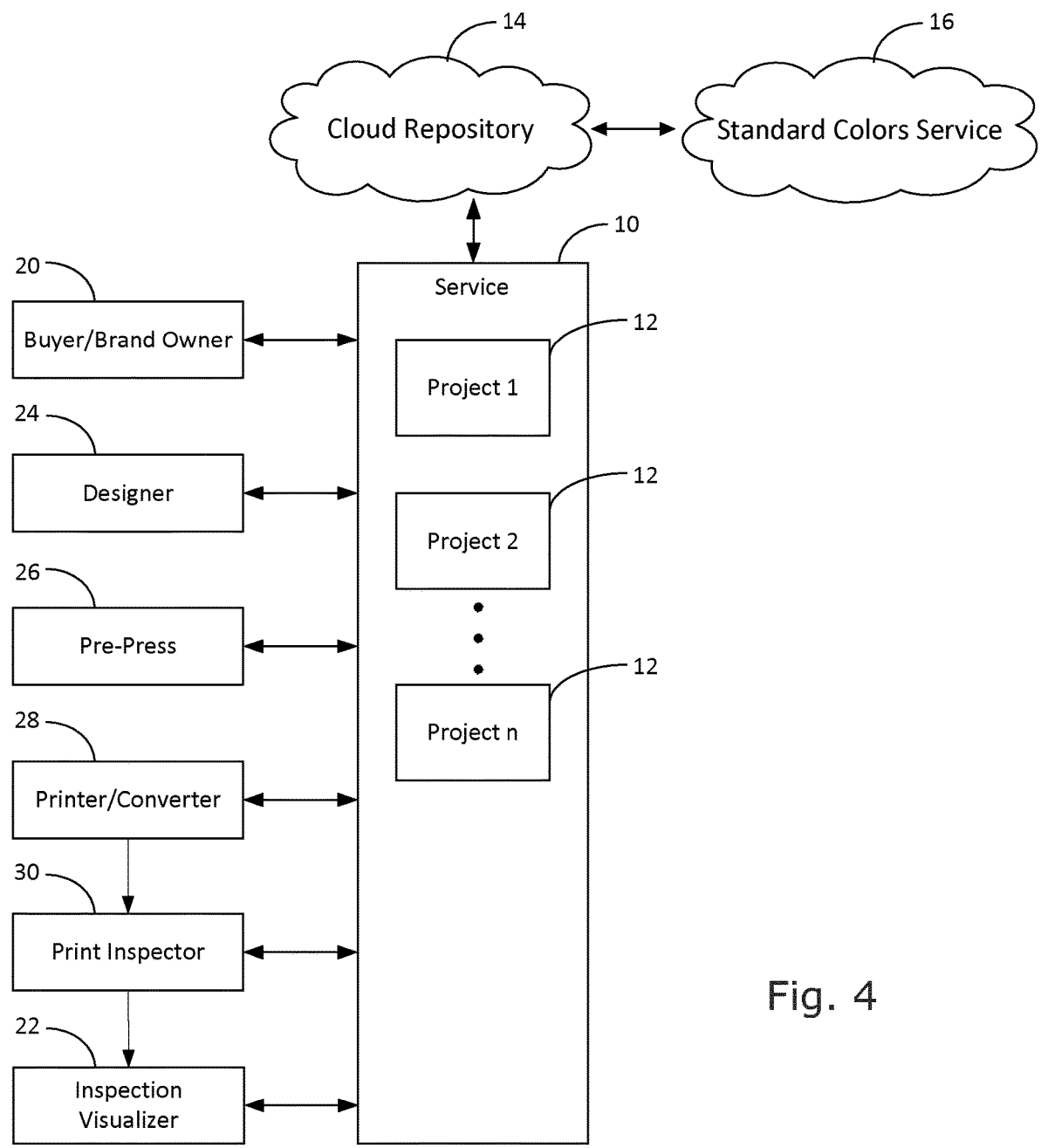
FIG. 4 is a block diagram of a print product development system according to another aspect of the present invention.

Referring to FIG. 4, in some embodiments, the Buyer/Brand Owner 20, Inspection Visualizer 22, Printer Converter 28, and Print Inspector 30 may communicate print product specifications and quality assurance information through an information hub. Information may also pass directly between entities. For example, Printer/Converter 28 would not necessarily contribute inspection image data from Print Inspector 30 to a hub. Also, Print Inspector 30 may provide access to its database directly to Inspection Visualizer 22.

A server is provided hosting a Print Product Project Management System 10 ("System"). The System 10 is used as a hub in an integrated workflow to generate printing information and products for producing a color printed product with an associated Quality Assurance Package 80.

In some embodiments, the System 10 comprises a cloud-based Software as a Service (SaaS) system. In some embodiments, the System 10 comprises a dedicated physical server or a virtual server. In some applications, the System 10 is comprises a tenant in an application hosted in a Platform as a Service (PaaS). In some applications, the PaaS is hosted in Infrastructure as a Service (IaaS). The System 10 may be accessed by various client computing devices operated, for example, by the Buyer or Brand Owner 20, the Inspection Visualizer 22, a Designer 24, a Pre-press Operator 26, and a Printer or Converter 28. The System 10 may be accessed via the Internet, WAN, LAN, or other computing network.

A Project 12 is created on the System 10 for each product to be printed. The Project 12 is a specification which includes various items of information, including information concerning materials and desired colors for the finished printed product. In some embodiments, the colors include or are based on Master Colors 32. Master Colors 32 may comprise spectral data or physical reference color chips. Examples of Master Colors 32 include commercial libraries of standardized colors, such as Pantone Matching System libraries. Brand owners may also have libraries of proprietary Master Colors 32 associated with their brands. Master Colors 32 may be specified without reference to printing conditions, such as printing process, substrate, and ink system.

In some embodiments, Master Colors 32 are associated with Production Colors 34. Production Colors 34 typically comprise measured color or spectral information reflecting an attempt to match its associated Master Color 32 as closely as reasonably possible by a printer or Converter 28. Typically, some measurable variation exists between a Master Color 32 and a Production Color 34 due to limitations based on printing conditions. A Production Color 34 may be particular to a single printer/converter, ink system, ink manufacturer, ink recipe, print process, printing press, and other printing conditions. A Printer or Converter 28 may supply color space values or spectral information of a Production Color 34 to a Buyer 20, who may then store the information in the System 10 or in an "Ink Book" hosted in a cloud repository 14. The Buyer 20 may associate the Production Color 34 to a Master Color 32 in the System 10. Individual Converters 28 may store such information for repeat jobs, but such detailed printing conditions information heretofore was not typically provided to a Brand Owner or other Buyer.

In some embodiments, Master Colors 32 are associated with Dependent Standard Colors, such as in Pantone's PantoneLIVE. Dependent Standard Colors comprise color or spectral measurements of representative examples of an attempt to match a Master Color 32 using a given common printing process (e.g., Offset Lithography, Flexography, Gravure), ink system and volume (e.g., water or solvent based, medium or heavy), and typical substrate (e.g., paper, cardboard, film, aluminum can). Dependent Standard Colors are not particular to a given printer/converter, printing press, ink recipe, or other specific printing condition.

Unless expressly limited, the term "Quality Assurance Color" as used herein refers to Production Colors 34 and/or Dependent Standard Colors. Unless expressly limited, the term "Quality Assurance Color Information" as used herein refers to Production Colors 34 and/or Dependent Standard Colors themselves, or references to where such colors may be retrieved for use. Master Colors 32, Production Colors 34, and Dependent Standard Colors may comprise spectral information or values in a color space, such as CIELAB, CIEXYZ, and RGB color spaces.

The Master Colors 32 may be associated with one or more packaged consumer goods, such as a branded good, including a sub brand or line extension. In another example, the Master Colors 32 comprise industry standard colors, such as Pantone Matching System Colors. These may also be referred to as Master Standard Colors. The Buyer may also add graphics to be included on the printed product to the Project 12.

Figure 5:
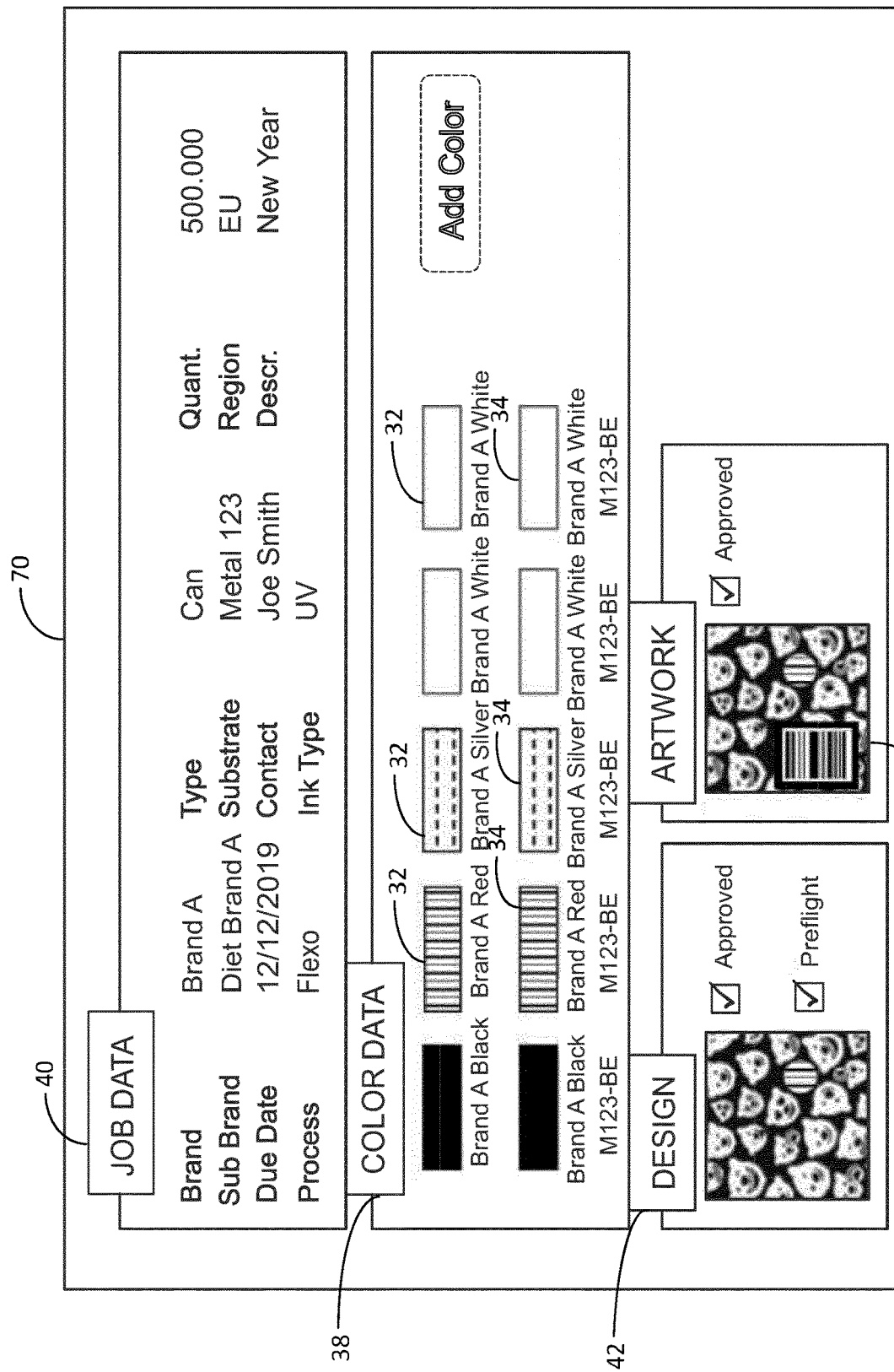
FIG. 5 illustrates information in a print product specification for a print product.
Figure 10:
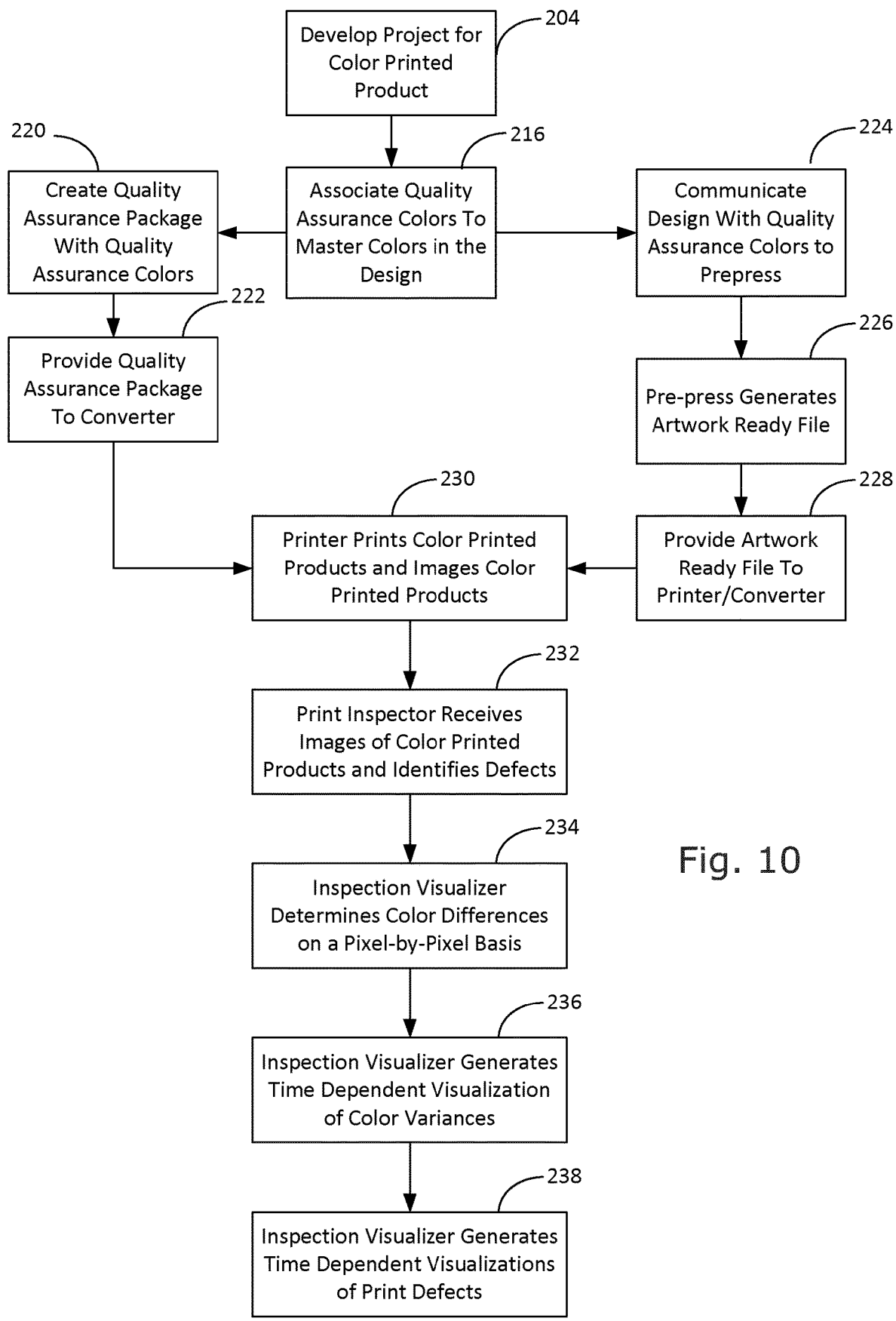
FIG. 10 is a method flow diagram according to another aspect of the present invention.

Referring to FIGS. 5 and 10, using the System 10, a Buyer 20 creates in Step 204 a Project 12. In the Project 12, the Buyer specifies Job Data 40, including the type of printed product (e.g., can, box) and material (e.g., metal, and cardboard). In the example of FIG. 5, Job Data 40 indicates that the substrate is metal can ("Metal 123"), printing process is Flexographic ("Flexo"), and ink base is an ultraviolet ("UV") curing ink. Other packaging/labeling will have other materials. The Master Colors 32 are displayed in a first row of Color Data 38 and Quality Assurance colors, such as Production Colors 34, are associated with Master Colors 32 in Step 216 and are displayed in a second row of Color Data 38, along with Quality Assurance Color identifiers ("M123-BE"). In some embodiments, the System 10 further takes into account the particular Converter 28 who will print the product when selecting Production Colors 34. In some embodiments the System 10 generates visual comparisons between the Master Color 32 and Quality Assurance Colors to show any slight differences due to printing conditions impact. The Buyer 20 may initiate an Artwork Approval Cycle. A record of acceptance of the Artwork 44 is maintained by the System 10 in the Project 12.

Figure 6:
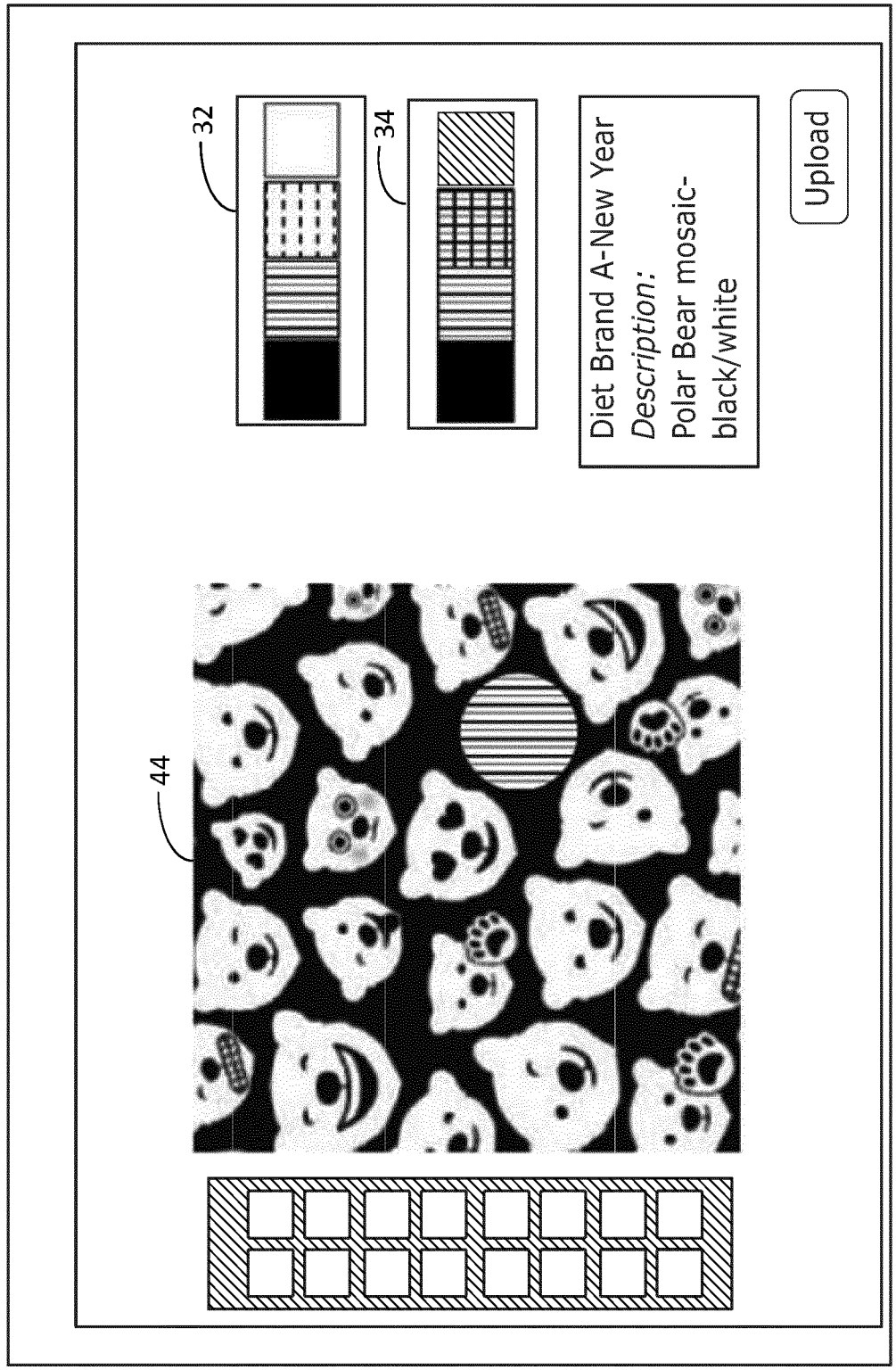
FIG. 6 illustrates information in a print product specification for a print product.

Referring to FIGS. 6 and 10, once the Artwork 44 is approved, the Pre-Press Operator 26 in Step 224 receives the Quality Assurance Color Information along with other information in the Project 12 via a Web Connector. Any of the conventional steps 226 of Pre-Press may occur at this stage. For example, final production separations are prepared. These represent the printing plates. Pre-Press may also generate quality assurance information for non-color related items. For example, a Pre-Press will indicate location of the product barcode and desired inspection settings to be tagged to that object. Pre-Press mat also indicate text areas, logos, and other items that need specific inspection. These settings may be used to define the color coding of the heatmaps, comparable to color deviation. In some embodiments, when the Pre-Press Operator 26 finishes his/her work, the resulting Pre-press Ready Job 46 is uploaded back to the Project 12. In some embodiments, the Pre-Press Ready Job 46 is stored 228 on computer facilities used by the Converter 28 or Pre-media.

Figure 7:
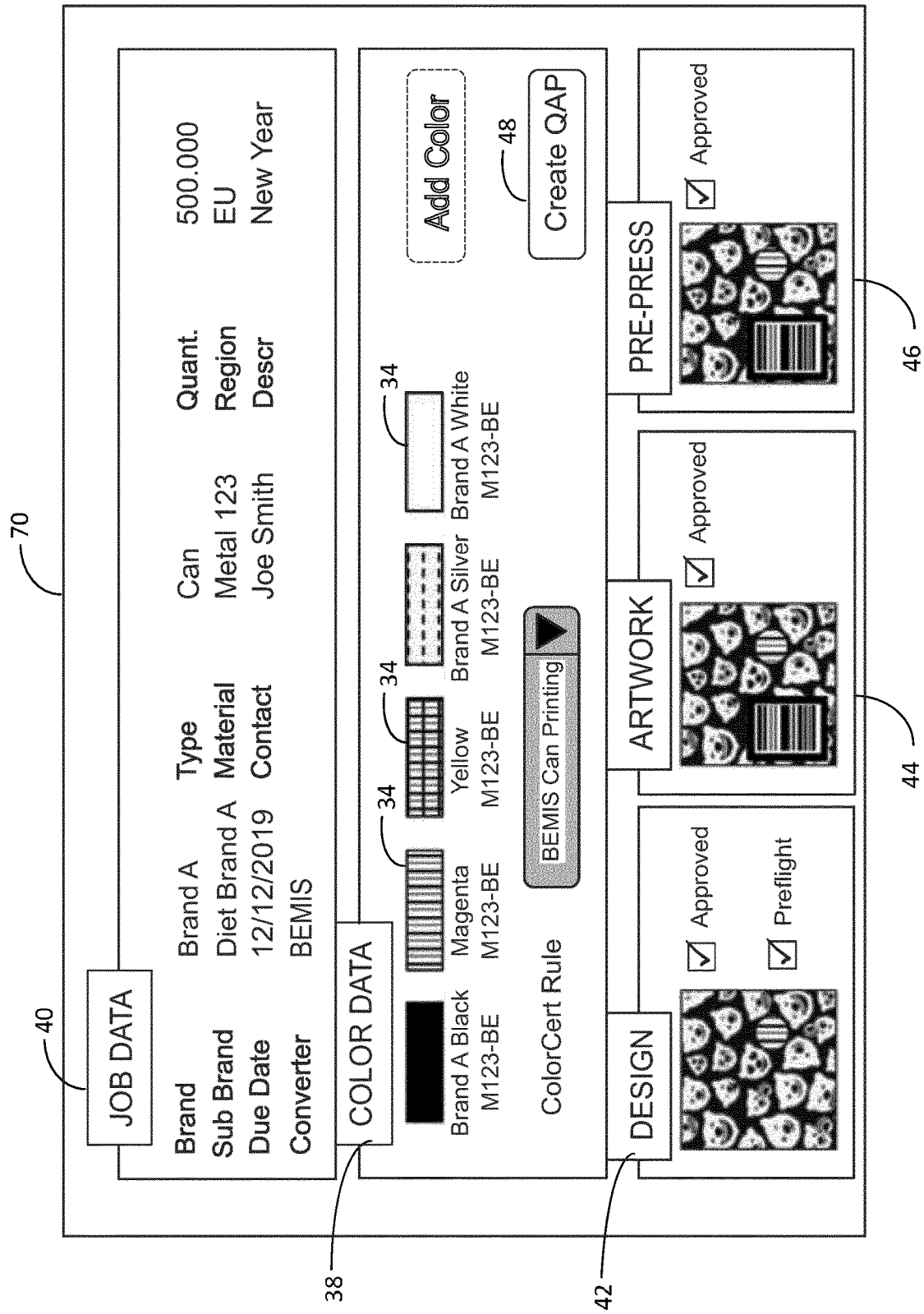
FIG. 7 illustrates information in a print product specification for a print product.

Referring to FIGS. 7 and 10, in Step 220, the System 10 uses available meta-data, Color Data 38 and color measurement rules to create a full Quality Assurance Package 80. This may be done automatically by System 10 upon actuation of a display button 48. The Quality Assurance Package 80 is made available to the Printer in Step 222. The Pre-press Ready Job 46 is approved and ready for production. The combination of the Quality Assurance Package 80 and Pre-press Ready Job 46 comprise a complete Product Specification.

Figure 8:
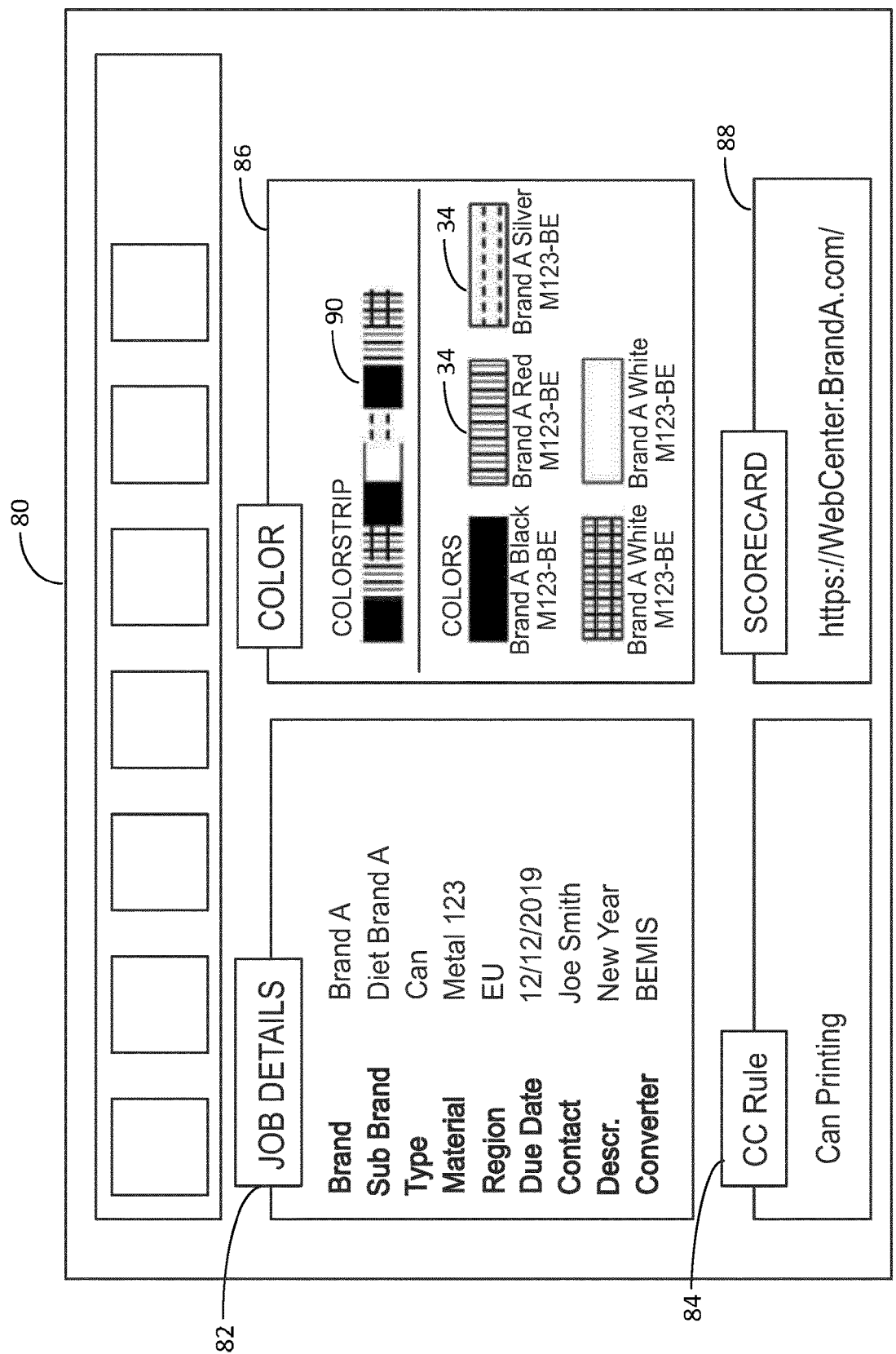
FIG. 8 illustrates information in a quality assurance package for a print product.

As illustrated in FIG. 8, the Quality Assurance Package 80 includes Job Details 82, such as type of printed product (e.g., can, carton, label), substrate material (e.g., metal, cardboard, plastic film), due date, description, and Converter 28. The Quality Assurance Package 80 also includes color information 86, including a color verification strip 92 to be printed for quality assurance measurements and the associated Quality Assurance Color Information which may include, in appropriate cases, definition of spot colors and/or CMYK profile or other ICC profile of the press. In some embodiments, the Quality Assurance Color Information completely replaces the Master Colors 32 and no Master Colors 32 are provided in the Quality Assurance Package 80. The Quality Assurance Package 80 also includes rules and tolerances 84 to follow when certifying that the printed product meets the Buyer's requirements, and a location 88 on the System 10 for uploading measurements and quality assurance scoring The Converter 28 accesses the Quality Assurance Package 80 in the Project 12. This Quality Assurance Package 80 is loaded into the appropriate color quality assurance software. During press set up and/or production, colors produced on a printed color verification strip are measured for compliance with the color verification strip 92 specified in the Quality Assurance Package 80. For example, scanned colors may be compared with the Production Colors 34 in the Quality Assurance Package 80.

Figure 9:
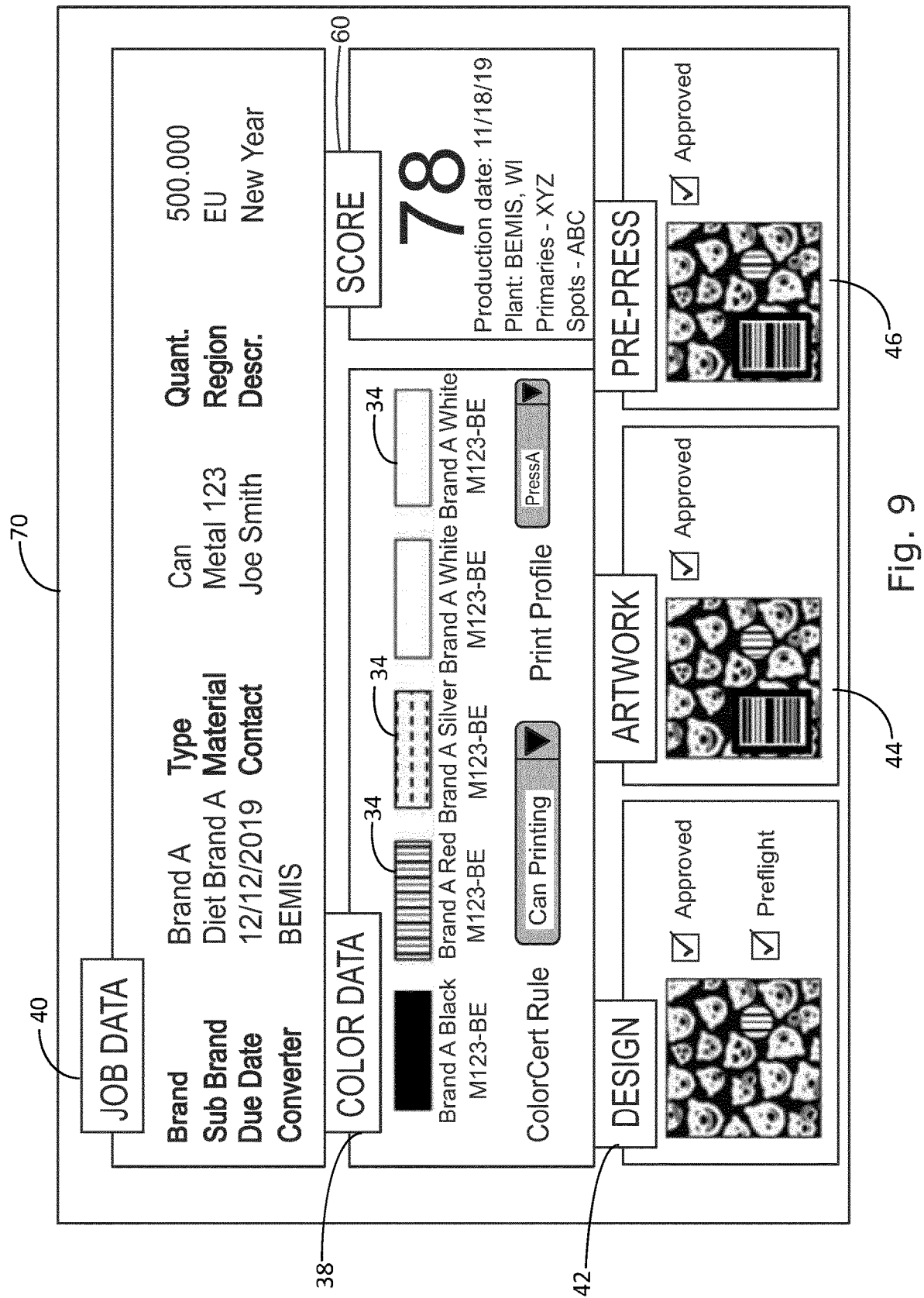
FIG. 9 illustrates information in a print product specification for a print product.

Referring to FIG. 10, in Step 230, the Converter 28 prints the color product and images the color printed products. Quality assurance scoring is reported back to the System 10. In some embodiments, the Printer/Converter 28 uploads scoring information to a Score Card server, where it is stored. Referring to FIG. 9, the Score Card server then transfers the scoring information to the System 10 where it is displayed in the Project 12. At least summary scoring information 60 is automatically available in the Project 12. Additional meta-data can be made available. In some embodiments, the System 10 permits a user to click-through to the Score Card server for all details.

The printing press or post press system at the Printer/Converter 28 includes print inspection cameras as described above. The Print Inspector 30 and/or Inspection Visualizer 22 receive images of color printed products in step 232. In Step 234, the Print Inspector 30 and/or Inspection Visualizer 22 determines color differences on a pixel-by-pixel basis. The Inspection Visualizer 22 generates color variance heatmaps in Step 236 and print defect heatmaps in Step 238 as described above, and uploads them to the System 10 for access by the Buyer 20 and/or the Printer/Converter 28.

The techniques and systems described herein are applicable across all types of color printed products, materials, and printing technologies.

While the foregoing example is described with respect to color printed products, the invention is not so limited. The Inspector Visualizer 22 may be employed to generate visual heatmaps of any product which undergoes optical inspection. For example, the invention may be applied to visualize appearance defects in polymer products, ceramic products, durable goods, textiles, architectural panels or flooring, wall coverings, or any application where a colored product is produced or manufactured.

In a ceramic product example, ceramic glaze is fused to a ceramic body. The glaze can impart color and other appearance attributes. The Visualization Inspector may generate heatmap images of the ceramic product indicating glazing defects, color variances, or both. In a polymer example, colorants may be mixed with a base material, and thermoformed into a color product. The base material may be, for example, General Purpose Polystyrene (GPPS), nylon, high density polyethylene (HDPE), low density polyethylene (LDPE), and others. The production polymer goods may have color patterns or other areas of interest which may be imaged, and color variances, surface defects, or both may be optically detected and visualized.

Additionally, while the example of a heatmap is disclosed as being part of an embodiment of the present invention, the invention is not so limited. The invention may be adapted to use additional or alternative data visualization techniques. For example, treemapping could be employed to spread the data from the rolls that were printed during a day on a press, for example, as a two dimensional area, and show the defects on top of this, according to types. This could be done per job or all jobs during a day or week or other time interval. The data could represent one press or more than one press. The image can show not only the defects by type and color changes, but also areas that were not inspected for some reason or another (inspection system switched off).

An exemplary method for visualizing appearance defects on color products comprises: acquiring a reference image for a color product; acquiring a plurality of images corresponding to a plurality of color products; determining whether an appearance defect exists for each of the plurality of color products by comparing each image of the plurality of images corresponding to the plurality of color products to the reference image; for each detected appearance defect, determining a severity of the appearance defect; and generating a visualization of appearance defects on an image of the color product based on the severity of the appearance defect and a frequency of occurrence of the appearance defect.

In some embodiments, the color product comprises a printed product and the appearance defect comprises a print defect. In some embodiments, the print defect comprises a color being out of tolerance. In some embodiments, the print defect comprises a printing registration error.

In some embodiments, the step of determining whether an appearance defect exists comprises comparing each of the plurality of images corresponding to a plurality of color products to the reference image on a pixel-by-pixel basis.

In some embodiments, the visualization of appearance defects comprises a multiple layer image. In some embodiments, the visualization of appearance defects comprises a multiple layer image, and layers comprising one or more appearance defects, such as color variance, streak, spot and bar code, are selectively displayable.

In some embodiments, the color product comprises a glazed ceramic product. In some embodiments, the color product comprises a polymer product.

In some embodiments, the step of acquiring a plurality of images corresponding to a plurality of color products is performed by a printer. In some embodiments, the step of acquiring a plurality of images corresponding to a plurality of color products is performed by a printer and the printer uses the visualization of appearance defects to control a printing machine which produced the color product.

In some embodiments, the step of acquiring a plurality of images corresponding to a plurality of color products is performed by a buyer as part of incoming color product inspection.

Embodiments within the scope of the present disclosure include physical and other computer-readable media for carrying or storing computer-executable instructions and/or data structures. In particular, one or more of the processes or methods described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes or methods, including one or more of the processes or methods described herein.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method for controlling production of color products, comprising:
   receiving a reference image for a color product;
   producing over the course of at least a portion of a production run a plurality of color products corresponding to the color product in the reference image;
   acquiring a plurality of images corresponding to the plurality of color products;
   determining whether an appearance defect exists for each of the plurality of color products by comparing each image of the plurality of images corresponding to the plurality of color products to the reference image;
   for each detected appearance defect, determining a severity of the appearance defect; and
   generating a visualization of appearance defects on a visualization image comprising the reference image of the color product based on the severity of the appearance defect and a frequency of occurrence of the appearance defect to visualize an accumulation of a plurality of appearance defects on the reference image based on each appearance defect detected in each of the plurality of images corresponding to the plurality of color products produced over the course of the at least a portion of a production run;
   adjusting production of the color product in response to the visualization of appearance defects to reduce the severity or frequency of occurrence of the appearance defect.

2. The method of claim 1, wherein the color product comprises a printed product and the appearance defect comprises a print defect;
   wherein the visualization image is a visualization of an accumulation of print defects over the course of a printing run.

3. The method of claim 2, wherein the print defect comprises a color being out of tolerance with respect to a specified production color.

4. The method of claim 2, wherein the print defect comprises a printing registration error.

5. The method of claim 2, wherein the visualization image provides a visualization of an accumulation of print defects over a plurality of print runs of the same printed product.

6. The method of claim 1, wherein the color product comprises a printed product produced on a printing press, the appearance defect comprises a print defect, and adjustments are made to the print press in response to the visualization of appearance defects.

7. The method of claim 1, wherein the visualization of appearance defects comprises a single layer image.

8. The method of claim 1, wherein the visualization of appearance defects comprises a multiple layer image.

9. The method of claim 1, wherein the visualization of appearance defects comprises a multiple layer image, and layers comprising one or more type of appearance defect are selectively displayable.

10. The method of claim 1, wherein the color product comprises a glazed ceramic product.

11. The method of claim 1, wherein the color product comprises a polymer product.

12. The method of claim 1, wherein the step of determining whether an appearance defect exists comprises comparing each of the plurality of images corresponding to a plurality of color products to the reference image on a pixel-by-pixel basis.

13. The method of claim 1, wherein the step of determining whether a defect exists further comprises storing defect information in a database.

14. The method of claim 13, wherein the step of generating a visualization of appearance defects further comprises accessing the defect information stored in the database.

15. A method for controlling production of color printed products, comprising:
receiving a reference image for a color printed product;
producing a plurality of color printed products corresponding to the color printed product in the reference image;
acquiring a plurality of images corresponding to the plurality of color printed products;
determining whether a print defect exists for each of the plurality of color printed products by comparing each image of the plurality of images corresponding to the plurality of color printed products to the reference image;
for each detected print defect, determining a severity of the print defect; and
generating a visualization of print defects on a visualization image of the color printed product based on the severity of the print defect and a frequency of occurrence of the print defect to visualize an accumulation of print defects over the course of a plurality of a production runs for the same color printed product;
adjusting production of the color print product in response to the visualization of print defects to reduce the severity or frequency of occurrence of the print defect.

16. The method of claim 15, wherein the print defect comprises a color being out of tolerance with respect to a specified production color.

17. The method of claim 15, wherein the print defect comprises a printing registration error.

18. The method of claim 15, wherein the visualization image comprises the reference image.

19. The method of claim 15, wherein the visualization image comprises an image of one of the plurality of color print products acquired when performing the method of claim 15.

* * * * *